Figure 1:
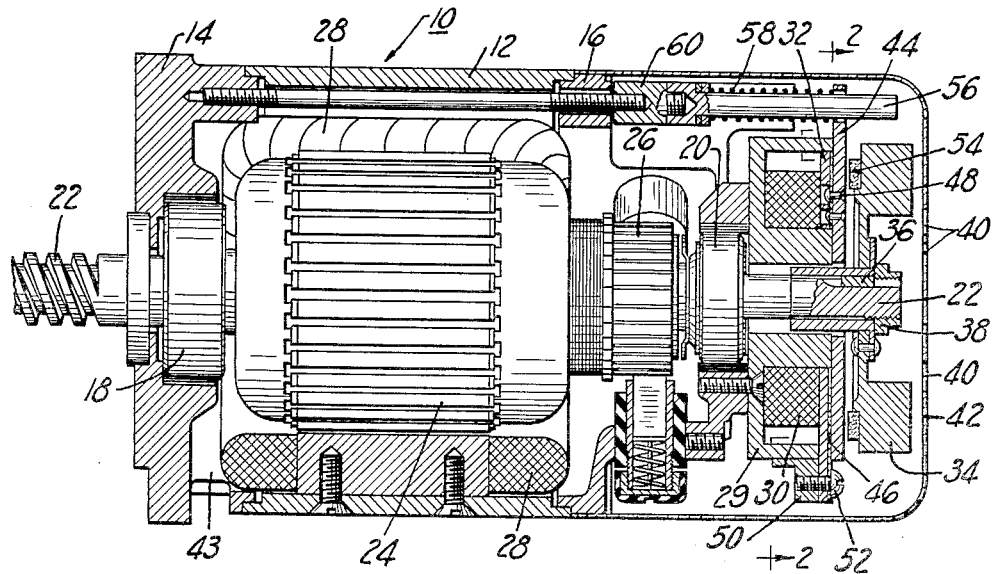

Aug. 29, 1950     J. L. HANCOCK     2,520,204
ELECTROMAGNETICALLY CONTROLLED BRAKE
Filed July 2, 1945

INVENTOR.
JOHN L. HANCOCK
BY
Richard C. Lindberg

Patented Aug. 29, 1950

2,520,204

UNITED STATES PATENT OFFICE 2,520,204

ELECTROMAGNETICALLY CONTROLLED BRAKE

John L. Hancock, Melrose Park, Ill., assignor to Nader Engineering Company, Chicago, Ill., a corporation of Illinois Application July 2, 1945, Serial No. 602,840

11 Claims. (Cl. 188—171)

This invention relates to rotating electrical machines and particularly to improvements in electromagnetic brakes for rotating electric machines.

In certain motor applications it is the practice to accomplish braking by electromagnetic means, which usually employs an electromagnet which is energized during operation of the motor to keep two braking surfaces apart, and so arranged that upon deenergization of the motor the electromagnet is simultaneously deenergized to cause the braking surfaces to come together and cause the rotating elements of the motor to stop quickly. One of the problems attendant upon the devices of the prior art was that of keeping the brake shoe free from twisting torques during the initial braking operation, thereby preventing free translative motion of the braking shoe during braking action, with the consequent lack of quick response of the braking action.

An object of the invention is to provide an arrangement where there is no twisting of the brake shoe during initial engagement with the brake lining to the end that the force of braking is not diminished during the brake application.

Another object of the invention is to provide a diaphragm spring capable of absorbing torque upon the brake shoe caused by braking but which will permit free translative movement of the brake shoe without appreciable friction.

Other objects of the invention will be apparent from a study of the specification hereinafter taken together with the drawings which illustrate a preferred embodiment of the invention. However, the invention is not limited in terms of the embodiment shown, but only by the scope and breadth of the claims subjoined.

Figure 2:
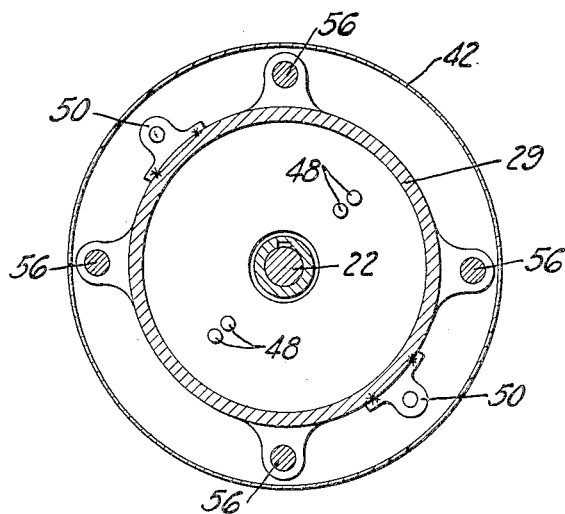

In the drawings:

Figure 1 is a substantially longitudinal section taken through an electrical rotating machine having embodied therein the structure according to the present invention; and Figure 2 is a view taken substantially along the line 2—2 in the direction of the arrows.

Referring now to Figure 1, there is shown a rotating electrical machine indicated generally by the ordinal 10, comprising a frame 12, supporting end closures 14 and 16, which respectively support bearings 18 and 20 in which a shaft 22 is journaled, shaft 22 having constructed thereon an armature 24 and a commutator 26. The armature and commutator assembly 24, 26 rotates inside a field structure 28 supported by the frame 12.

The end closure 16 has secured thereto a substantially cup shaped annulus 29 having wound therein a current-carrying coil 30, the cup of the annular shaped member and the winding 30 being closed by a disk 32. The winding 30 may be energized from any suitable source and may be connected in series or parallel with the field 28 or armature 24 to set up a magnetic flux for a purpose later to be described.

Mounted upon the right end of the shaft 22 is a fan 34, or other rotating member, which is held against rotation with respect to the shaft 22 by a key 36 and a nut 38. The fan 34 acts to draw air through a plurality of apertures 40 in a dust cover 42 which is secured to the end closure member 16 by any convenient manner as by the press fit shown. The air entering the apertures 40 is moved by the fan 34 around the assembly 29, 30, 32 cooling same, and then passes over the commutator 26 and the armature 24 cooling them in turn, and makes exit from the motor 10 by an exit 43.

Means are provided for effecting cooperation with the fan 34 to cause braking of the motor 10 upon deenergization of the motor, and as shown with reference to Figure 1 takes the form of a braking member 44 which is supported near its center by means of a disk spring 46 riveted thereto at 48, clearance being provided for the heads of the rivets 48 by means of apertures 49 formed in the closure disk 32. The spring 46 is secured at two points on its periphery by means of a pair of lugs 50 welded to the annular shaped member 29 and secured to the lug 50 by means of bolts 52.

Means are provided for constantly biasing the braking member 44 in a direction to engage a brake lining 54 mounted upon the fan 34, or other rotating member, and as shown, takes the form of a plurality of studs 56 around which is supported a coil spring 58, one end of which bottoms upon a member 60, the other end of which biases against member 44.

The operation of the arrangement thus far described is as follows: upon energization of the motor 10 the winding 30 is simultaneously energized and the braking member 44 is drawn to the left out of contact with the braking surface 54 mounted upon the fan 34. When the armature 24 or field 28 is deenergized winding 30 is simultaneously deenergized, and by means of the springs 58, the member 44 is quickly moved to the right to engage the braking surface 54 to bring the armature 24 quickly to a standstill. By means of the spring 46 the armature 44 is prevented from twisting during the braking process, thus insuring that the armature 44 is free from rotative movement and free to move axially to engage or disengage the brake surface 54 without binding at the studs 56 without diminishing the force of braking during the initial braking process with the consequent inability of the motor 10 to be stopped quickly. Similarly, during starting, the armature 44 is free to move axially to disengage the braking surface so that the motor 10 may be brought to proper speed quickly as possible.

The invention has been described in terms of a preferable embodiment; however, the embodiment shown is for purpose of illustration only and is not intended to limit the invention, the invention being limited only by the terms here appended.

I claim:

1. A rotating electrical machine comprising a frame, an armature rotating within said frame, means carried by said armature and adapted to support a braking surface, a non-rotatable element supported by said frame and tending to move in a direction to cooperate with said braking surface, electromagnetic means for controlling the movement of said element, and centering means comprising a spring disk secured to said electromagnetic means.

2. A rotating electrical machine comprising a frame, an armature rotating within said frame, means carried by said armature and adapted to support a braking surface, a plurality of studs supported by said frame, a non-rotatable element supported by said frame for cooperating with said braking surface, means supported by said studs tending to move said non-rotatable element in a direction to cooperate with said braking surface, electromagnetic means for controlling said element, and centering means for said element comprising a spring disk secured to the electromagnetic means, whereby said non-rotatable element may freely move on said studs during braking operation.

3. A rotating electrical machine comprising a frame, an armature rotating within said frame, a fan carried by said armature, a braking surface carried by said fan, an annular member supporting an electromagnet therein, a disk providing a closure for said electromagnet and said annular member, a non-rotatable element, a plurality of studs carried by said frame, springs supported by said studs tending to move said non-rotatable member in a direction to engage said braking surface, and a spring disk having its periphery secured to said annular member and its center portions secured to said non-rotatable member for preventing twisting of said non-rotatable member during the braking operation.

4. A rotating electric machine comprising a frame, an armature rotating within said frame, a braking surface carried by said armature, an annular member supporting an electromagnet therein, a disk providing a closure for said electromagnet, a non-rotatable element, a plurality of studs carried by said frame, springs supported by said studs tending to move said non-rotatable member in a direction to engage said braking surface, and a disk spring having its periphery secured to said annular member and its center portions secured to said non-rotatable member for preventing twisting of said non-rotatable member and binding of said non-rotatable member on said studs during braking.

5. In a rotating electrical machine a frame, a rotor mounted in said frame, a braking surface supported for rotation with said rotor, an electromagnet supported by said frame, a plurality of studs secured to said frame, a brake member controlled by said electromagnet and movable into contact with said braking surface, resilient means supported by said studs for moving said brake member into engagement with said braking surface, and means for preventing torsional movement of said braking member for eliminating binding of said braking member on said studs during the braking operation.

6. In a rotating electrical machine, a frame, a rotor mounted in said frame, a braking surface supported for rotation with said rotor, an electromagnet supported by said frame, a plurality of studs secured to said frame, a brake member controlled by said electromagnet and movable into contact with said braking surface, resilient means supported by said studs for moving said brake member into engagement with said braking surface, and means comprising a thin disk for preventing torsional movement of said braking member for eliminating binding of said braking member on said studs during the braking operation.

7. A rotating electrical machine comprising a frame, an armature rotating within said frame, a fan carried by said armature, a braking surface supported by said fan, a non-rotatable element supported by said frame and movable into contact with said braking surface, electromagnetic means intermediate said armature and said fan for moving said non-rotatable element, a plurality of studs carried by said frame, springs supported by said studs tending to move said non-rotatable member in a direction to contact said braking surface, and centering means comprising a spring disk secured to said electromagnetic means and to said non-rotatable element for preventing twisting of the non-rotatable element during the braking operation.

8. A rotating electrical machine comprising a frame, a rotor mounted for rotation in said frame, a braking surface supported by said rotor for rotation therewith, a non-rotatable member supported by said frame and movable in a direction to contact said rotating braking surface, electromagnetic means for controlling the movement of said non-rotatable member, and means for preventing twisting of said non-rotatable member during contact with said braking surface comprising a spring disk secured to said electromagnetic means.

9. A rotating electrical machine comprising a frame, a rotor mounted for rotation in said frame, a braking surface supported by said rotor for rotation therewith, a plurality of studs supported by said frame, a non-rotatable member movable in a direction to contact said braking surface, electromagnetic means for moving said non-rotatable member, means supported by said studs tending to move said non-rotatable member in a direction opposed to the movement of said non-rotatable member by said electromagnetic means, and means for preventing twisting of said non-rotatable member during contact with said braking surface comprising a spring disk secured to said electromagnetic means.

10. In a rotating electrical machine, a frame, a rotor mounted in said frame, a braking surface supported for rotation with said rotor, a brake member movable into contact with said braking surface, an electromagnet for moving said brake member, a plurality of studs secured to said frame for supporting resilient means for opposing the movement of said brake member by said electromagnet, and means for preventing torsional movement of said brake member on contact with said braking surface for eliminating binding of said brake member on said studs during the braking operation.

11. In a rotating electrical machine, a frame, a rotor mounted in said frame, a braking surface supported for rotation with said rotor, a brake member movable into contact with said braking surface, an electromagnet for moving said brake member, a plurality of studs secured to said frame for supporting resilient means opposing the movement of said brake member by said electromagnet, and means comprising a thin disk for preventing torsional movement of said brake member on contact with said braking surface for eliminating binding of said brake member on said studs during the braking operation.

JOHN L. HANCOCK.

REFERENCES CITED

The following references are of record in the file of this patent:

UNITED STATES PATENTS

| Number | Name | Date |
|---|---|---|
| 688,670 | McGeorge | Dec. 10, 1901 |
| 1,932,970 | Howe | Oct. 31, 1933 |
| 2,307,340 | Thelander | Jan. 5, 1943 |
| 2,348,025 | Peets et al. | May 2, 1944 |
| 2,353,185 | Oetzel | July 11, 1944 |

FOREIGN PATENTS

| Number | Country | Date |
|---|---|---|
| 232,063 | Great Britain | Apr. 16, 1925 |
| 239,862 | Great Britain | Apr. 15, 1926 |
| 456,678 | Great Britain | Nov. 13, 1936 |
| 590,525 | France | June 18, 1925 |
| 753,399 | France | Aug. 7, 1933 |